United States Patent
Lee et al.

(10) Patent No.: US 10,619,552 B2
(45) Date of Patent: Apr. 14, 2020

(54) COOLANT CONTROL VALVE UNIT HAVING HOLDER

(71) Applicants: Hyundai Motor Company, Seoul (KR); Kia Motors Corporation, Seoul (KR)

(72) Inventors: Hyo Jo Lee, Gyeonggi-do (KR); Yonggyu Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 211 days.

(21) Appl. No.: 15/830,256

(22) Filed: Dec. 4, 2017

(65) Prior Publication Data
US 2019/0078495 A1    Mar. 14, 2019

(30) Foreign Application Priority Data

Sep. 13, 2017   (KR) .................. 10-2017-0117084

(51) Int. Cl.
| | |
|---|---|
| F01P 7/16 | (2006.01) |
| F16K 17/00 | (2006.01) |
| F01P 7/14 | (2006.01) |
| F16K 31/524 | (2006.01) |
| F16K 11/16 | (2006.01) |
| F16K 27/02 | (2006.01) |
| F16K 17/38 | (2006.01) |

(52) U.S. Cl.
CPC .............. *F01P 7/16* (2013.01); *F16K 11/165* (2013.01); *F16K 17/003* (2013.01); *F16K 17/38* (2013.01); *F16K 27/0263* (2013.01); *F16K 31/52416* (2013.01); *F01P 2007/146* (2013.01)

(58) Field of Classification Search
CPC ...... F01P 7/16; F01P 2007/146; F16K 17/003
See application file for complete search history.

(56) References Cited

U.S. PATENT DOCUMENTS

| | | | | |
|---|---|---|---|---|
| 2005/0123641 A1* | 6/2005 | Kim | ...................... | B29C 45/281 425/547 |
| 2009/0173295 A1* | 7/2009 | Fishman | .................. | F01P 7/167 123/41.08 |
| 2010/0077583 A1* | 4/2010 | Takaya | ...................... | F01P 7/16 29/213.1 |
| 2012/0279462 A1* | 11/2012 | Warnery | .................. | F01P 7/167 123/41.08 |
| 2013/0180477 A1* | 7/2013 | Nakajima | ............... | F01P 7/167 123/41.05 |
| 2015/0240703 A1* | 8/2015 | Atz | ...................... | F02B 29/0475 123/542 |

FOREIGN PATENT DOCUMENTS

| | | |
|---|---|---|
| JP | 4711840 B2 | 6/2011 |
| KR | 10-2010-0117909 | 7/2012 |
| KR | 10-1403437 B1 | 6/2014 |
| KR | 10-1720568 B1 | 3/2017 |

\* cited by examiner

*Primary Examiner* — Kevin A Lathers
(74) *Attorney, Agent, or Firm* — Mintz Levin Cohn Ferris Glovsky and Popeo, P.C.; Peter F. Corless

(57) ABSTRACT

A coolant control valve unit includes: a housing in which a coolant passage is formed; an elastic member supporting the valve unit elastically so that the coolant passage is closed by the valve unit; a holder supporting the elastic member; and a fixing portion that fixes the holder to the housing.

11 Claims, 8 Drawing Sheets

COOLANT CONTROL VALVE UNIT HAVING HOLDER

CROSS-REFERENCE TO RELATED APPLICATION

This application claims the benefit of priority to Korean Patent Application No. 10-2017-0117084, filed in the Korean Intellectual Property Office on Sep. 13, 2017, the entire contents of which are incorporated herein by reference.

BACKGROUND OF THE DISCLOSURE

(a) Technical Field

The present disclosure is related generally to valve units and, more particularly, to a coolant control valve unit having a holder disposed inside a housing, the coolant control valve unit capable of preventing the holder from sticking out by a supporting force of an elastic member.

(b) Description of the Related Art

It is well-known that an engine generates torque from combustion of fuel. A large amount of the generated energy is exhausted in the form of heat energy. Coolant circulates the engine to absorb the heat energy and radiates the absorbed heat energy outside of a vehicle through a radiator.

In general, low coolant temperatures increase viscosity of the oil, frictional forces between components, fuel consumption, and the amount of harmful gas exhaustion. High coolant temperatures, meanwhile, cause knocking, in which case the ignition timing needs to be adjusted to suppress the knocking. This, in turn, may deteriorate the performance of the engine. Also, if lubricant is overheated, lubrication may deteriorate.

Therefore, a system that controls several cooling elements through one valve unit is often used. A specific part of the system maintains the coolant at a high temperature, while another part thereof maintains the coolant at a low temperature. In general, a coolant control valve unit includes a motor, gear box, cam, rod, valve, and elastic member. The motor rotates the cam through the gear box. At the bottom of the cam, a track having a predetermined slope and height is formed along a rotating direction from a predetermined position. As the cam rotates, the track pushes the end of the rod, and the valve installed in the road opens and closes the coolant passage.

The elastic member supports the valve toward the cam elastically, and the elastic member is supported by a spring holder (hereinafter referred to as a "holder"). The holder is fastened to the housing, where the holder may protrude to the outside by the elastic force of the spring, causing a supporting structure to weaken, or operational durability and stability of the coolant control valve to deteriorate.

Therefore, research is being conducted into a structure that fastens the holder which supports the elastic member more firmly to the housing, reinforces the supporting structure, and improves the operational durability and stability of the coolant control valve unit.

The specifics in this background section are intended to enhance understanding of the background of the disclosure and may include those specifics not belonging to the related art already known to those skilled in the art to which the present disclosure belongs.

SUMMARY OF THE DISCLOSURE

The present disclosure has been made in an effort to provide a coolant control valve unit having a holder that fixes the holder more firmly to a housing, improves the overall robustness of the coolant control valve unit, and improves operational durability and stability of the valve simultaneously. The holder supports an elastic member which in turn supports the valve elastically.

According to embodiments of the present disclosure, a coolant control valve unit having a holder includes: a housing in which a coolant passage is formed; an elastic member supporting the valve unit elastically so that the coolant passage is closed by the valve unit; a holder supporting the elastic member; and a fixing portion that fixes the holder to the housing.

The fixing portion may include a supporting member formed at a predetermined position in the holder and supported by or coupled to an interior surface of the housing.

The holder may have a coolant hole corresponding to the valve unit, the fixing portion may include a metal gasket mounted along a periphery of the coolant hole, an edge of the metal gasket being supported by a latch formed in the housing.

The metal gasket may be inserted into a mold when the holder is injection molded by the mold.

The metal gasket may include a circular ring member and a latch protrusion that extends outwards from the ring member.

The latch protrusion may be arranged at predetermined distance along a circumference of the ring member.

The ring member may be fixed to the holder, and the latch protrusion may be supported by the latch.

A sealing member may be mounted on an outer mounting surface of the housing in which the holder is disposed.

The metal gasket may be fixed to the holder at a position corresponding to another elastic member supporting a lower surface of a safety valve.

At least three coolant passages are formed in the housing, at least three valves are formed in accordance with the at least two coolant passages, at least three elastic members are used according to the at least two valves, and coolant passages may be formed in the holder at positions corresponding to the respective at least two elastic members.

The holder may be mounted inside the housing, the fixing portion may be fixed to the housing so that the holder does not protrude through an opening formed in the housing, a mounting surface may be formed on an exterior surface of the housing, and a sealing member may be mounted along an edge of the mounting surface.

Furthermore, according to embodiments of the present disclosure, a coolant control valve unit includes: a housing having coolant passages formed in one side thereof; elastic members supporting valves elastically so that the valves close the respective coolant passages; a holder fixed to the housing and supporting the elastic members; and a fixing portion that fixes the holder to the housing.

Coolant holes may be formed in the holder in correspondence with the valves.

One of the valves may be a thermostat-type safety valve.

The fixing portion may include a supporting member formed in the holder at a predetermined position and supported by or coupled to an interior surface of the housing; and a metal gasket mounted along a periphery of a coolant hole among the coolant holes which corresponds to the safety valve, the edge of the metal gasket being supported by a latch formed in the housing.

The metal gasket may include a circular ring member and a latch protrusion that extends outwards from the ring member, and the latch protrusion may be arranged at predetermined distance along a circumference of the ring member.

When a coolant control valve unit according to embodiments of the present disclosure is mounted in a cylinder head, the holder does not protrude to the outside of the housing, thereby improving sealing performance. Also, when the valve operates, displacement of the holder is reduced, durability of the holder is improved, operational stability of the valve unit is improved, abrasion of the valve is reduced, and thereby sealing performance is improved. Moreover, it is possible to reduce cost and improve productivity by constructing a holder that supports two or more elastic members.

BRIEF DESCRIPTION OF THE DRAWINGS

The embodiments herein may be better understood by referring to the following description in conjunction with the accompanying drawings, briefly described below, in which like reference numerals indicate identically or functionally similar elements

Figure 1:
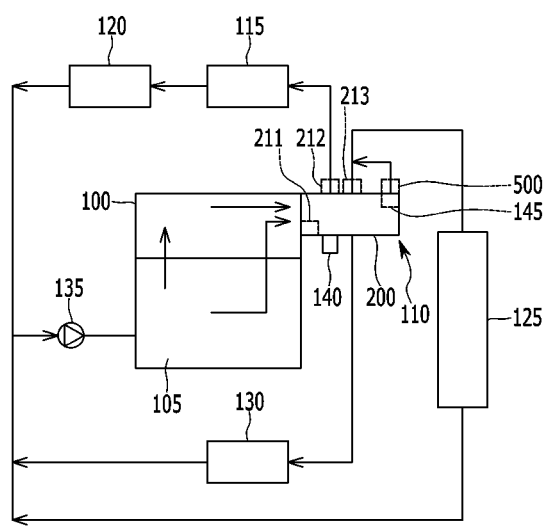
FIG. 1 is a schematic diagram illustrating a flow of coolant in a cooling system according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

In what follows, embodiments of the present disclosure will be described in detail with reference to accompanying drawings. It should be noted that the size and the thickness of each component shown in the drawings are arbitrarily chosen for the convenience of description. Therefore, the present disclosure is not necessarily limited to those shown in the drawings; to illustrate various portions and areas clearly, thickness thereof has been enlarged. The drawings and description are to be regarded as illustrative in nature and not restrictive, and the same reference numerals are applied for the same or similar constituent elements throughout the specification.

In the following description, dividing names of components into first, second and the like is to divide the names because the names of the components are the same as each other and an order thereof is not particularly limited. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Referring now to the presently disclosed embodiments, FIG. 1 is a schematic diagram illustrating a flow of coolant in a cooling system according to embodiments of the present disclosure.

As shown in FIG. 1, a cooling system includes a coolant pump 135, cylinder head 100, cylinder block 105, coolant control valve unit 110, coolant temperature sensor 140, safety valve 145, radiator 125, oil cooler 130, heater core 120, and exhaust gas recirculation (EGR) cooler 115.

The coolant pump 135 pumps the coolant to the coolant inlet of the cylinder block 105, and the pumped coolant flows through the cylinder head 100 and the cylinder block 105.

The coolant control valve unit 110 is mounted in the coolant outlet side of the cylinder head 100, the cylinder head 100 always supplies the coolant to the coolant control valve unit 110, and the coolant control valve unit 110 may control the flow of the coolant exhausted in the cylinder block 105.

A coolant temperature sensor 140 sensing the temperature of the coolant is disposed in the coolant control valve unit 110, and the coolant control valve unit 110 includes the safety valve 145. At this time, if the coolant temperature rises abnormally, the safety valve 145 is opened so that the coolant flows toward the radiator 125.

The coolant control valve unit 110 always distributes the coolant toward the oil cooler 130, controls the flow of the coolant that flows toward the EGR cooler 115, and controls the flow of the coolant that flows towards the radiator 125.

Figure 2:
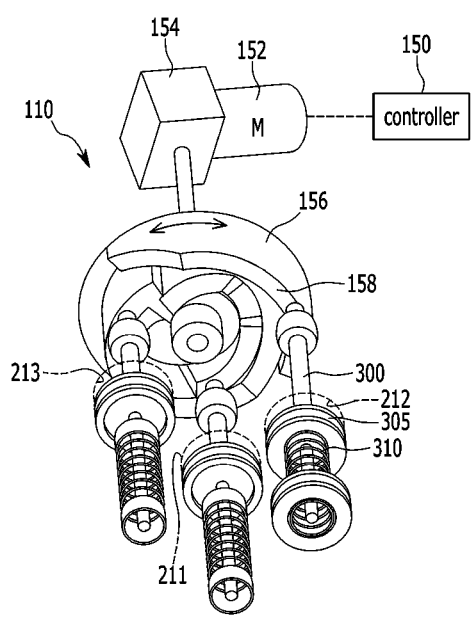
FIG. 2 is a part of an exploded perspective view of a coolant control valve unit according to embodiments of the present disclosure.

FIG. 2 is a part of an exploded perspective view of a coolant control valve unit according to embodiments of the present disclosure.

As shown in FIG. 2, the coolant control valve unit 110 includes a motor 152, gear box 154, cam 156, track 158, rod 300, valve 305, and elastic member 310; and the control portion 150 controls the motor 152 according to the operating condition (such as coolant temperature).

The motor 152 rotates the cam 156 through the gear box 154 and the axle. At the bottom of the cam 156, the track 158 having a predetermined slope and height is formed along a rotating direction from a predetermined position.

The upper portion of the rod 300 corresponds to the track 158, and according to the rotation of the cam 156, the track 158 pushes the upper portion of the rod 300 toward the lower portion. And the valve 305 is formed in the central portion of the rod 300, and the elastic member 310 supports the valve 305 upwards elastically.

The coolant control valve unit 110 includes the housing 200, and a coolant passage is formed in the housing 200.

Three rods 300 and valves 305 are formed in the lower portion of the cam 156, and the three valves 305 may open and close the coolant passage according to the rotational position of the cam 156.

The coolant passage comprises a first, second, and third coolant passage 211, 212, 213, where the first coolant passage 211 may control the flow of the coolant exhausted in the cylinder block 105, the second coolant passage 212 may control the flow of the coolant distributed to the heater core 120, and the third coolant passage 213 may control the flow of the coolant distributed to the radiator 125.

Figure 6:
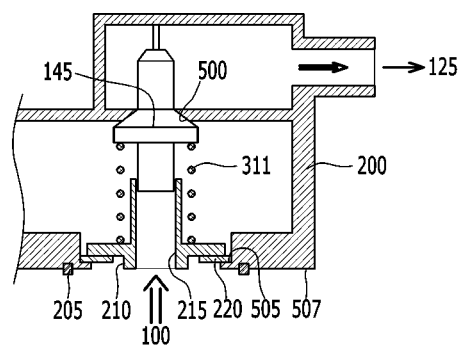
FIG. 6 is a part of a cross-sectional view of a coolant control valve unit according to embodiments of the present disclosure.

As shown in FIG. 6, the safety valve 145 is structured to open and close the bypass passage 500 independently of the operation of the cam 156. At this time, the safety valve 145 may be of thermostat type operated according to the coolant temperature.

Figure 3:
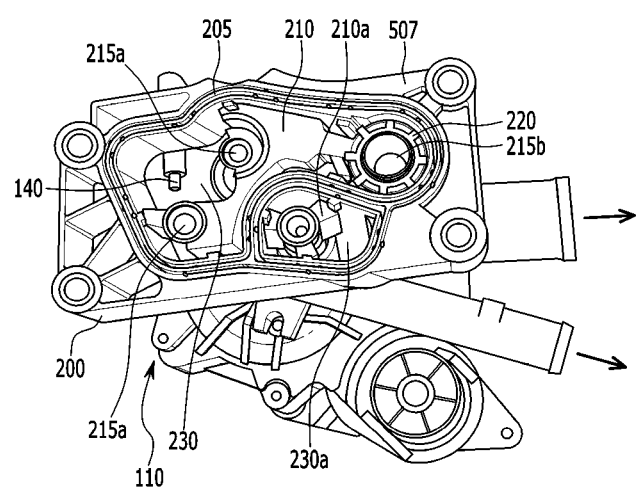
FIG. 3 is a perspective view of a coolant control valve unit according to embodiments of the present disclosure.
Figure 4:
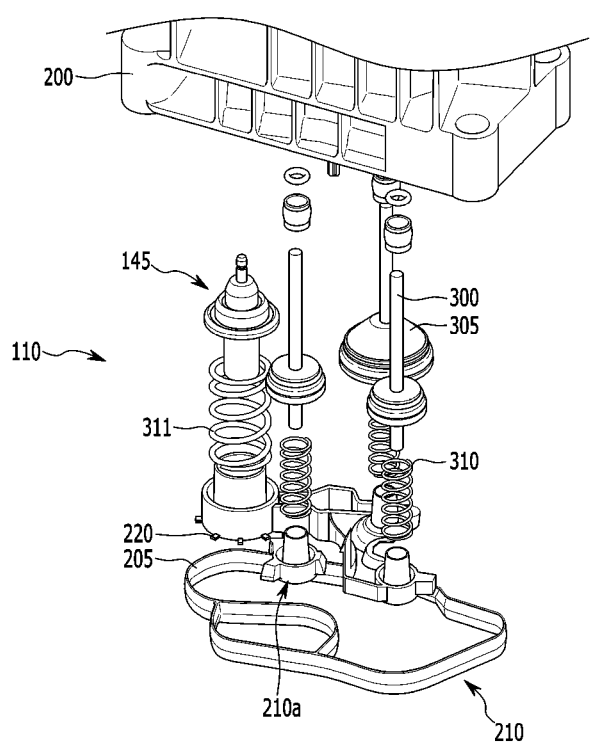
FIG. 4 is a part of an exploded perspective view of a coolant control valve unit according to embodiments of the present disclosure.

FIG. 3 is a perspective view of a coolant control valve unit according to embodiments of the present disclosure. FIG. 4 is a part of an exploded perspective view of a coolant control valve unit according to embodiments of the present disclosure.

As shown in FIG. 3, a mounting surface 507 mounted on the cylinder head 100 is formed on the outer side of the housing 200. And a sealing member 205 is disposed along the edge of the mounting surface 507.

An opening 230 is formed in the mounting surface 507 towards the inside of the sealing member 205, and the holder 210 is mounted being inserted to the opening 230.

Referring to FIGS. 3 and 4, the holder 210 substantially supports the elastic member 310 and is fixed to the housing 200 through the fixing portion. At this time, the fixing portion prevents the holder 210 from protruding from the housing 200, where the fixing portion may include the supporting member 400 and the metal gasket 220 shown in FIG. 5.

In addition, a sub-holder 210a for the valve 305 may be mounted being further inserted into the sub-opening 230a of the mounting surface 507.

In the holder 210, coolant holes 215a and 215b are formed, corresponding to the valve 305 and safety valve 145, respectively. At this time, as shown in FIG. 4, the holder 210 may support two valves 305 and one safety valve 145.

Figure 5:
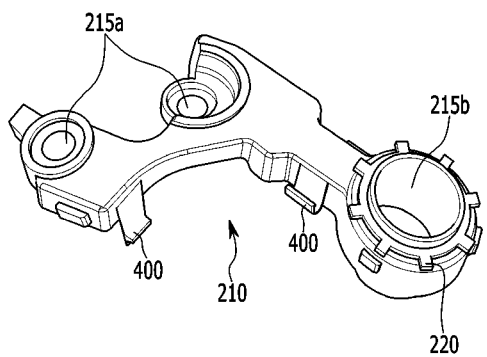
FIG. 5 is a perspective view of a holder mounted in a coolant control valve unit according to embodiments of the present disclosure.

FIG. 5 is a perspective view of a holder mounted in a coolant control valve unit according to embodiments of the present disclosure.

As shown in FIG. 5, in the holder 210, three coolant holes 215a and 215b are formed corresponding to two valves 305 and one safety valve 145, and a fixing portion that fixes the holder 210 to the housing 200 is formed. At this time, the fixing portion includes a supporting member 400 and a metal gasket 220.

The supporting member 400 is formed at a predetermined position on the side surface of the holder 210, which may be snap-coupled to the housing 200 or supported by the interior surface (600, FIG. 8) of the housing 200.

In embodiments of the present disclosure, since the elastic force of the elastic member 311 supporting the safety valve 145 is larger than that of the elastic member 310 supporting the valve 305, the metal gasket 220 may be disposed more at the position corresponding to the safety valve 145.

The metal gasket 220 has a circular ring shape formed along the periphery of the coolant hole 215b corresponding to the safety valve 145. And the metal gasket 220 is inserted inside the mold when the holder 210 is injected, which may be integrally combined with the holder 210.

Figure 7:
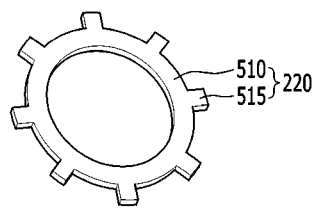
FIG. 7 is a perspective view of a metal gasket mounted in a coolant control valve unit according to embodiments of the present disclosure.

FIG. 6 is a part of a cross-sectional view of a coolant control valve unit according to embodiments of the present disclosure, and FIG. 7 is a perspective view of a metal gasket mounted in a coolant control valve unit according to embodiments of the present disclosure.

As shown in FIGS. 6 and 7, a bypass passage 500 is formed in the housing 200, and the safety valve 145 is disposed in the bypass passage 500.

And the elastic member 311 supports the bottom surface of the safety valve 145 in the upward direction so that the safety valve 145 closes the bypass passage 500.

The lower portion of the elastic member 310 is supported by the upper surface of the holder 210, the edge of the holder 210 is supported by the metal gasket 220 toward the housing 200, and the coolant hole 215 is formed in the holder 210.

More specifically, the metal gasket 220 includes a ring-shaped ring member 510 formed along the periphery of the coolant hole 215b and the latch protrusion 515 extending from the ring member 510 in the radial direction. The latch protrusion 515 is arranged at predetermined distance along the circumference of the ring member 510.

The upper surface of the ring member 510 is attached firmly to the bottom surface of the holder 210, and the latch protrusion 515 is supported by the latch 505 formed in the housing 200. Therefore, the metal gasket 220 may effectively prevent the holder 210 from protruding outward by the elastic member 311 supporting the safety valve 145.

Figure 8:
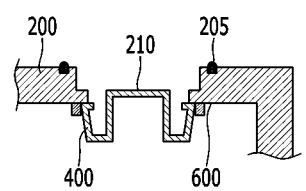
FIG. 8 is a part of a cross-sectional view of a coolant control valve unit according to embodiments of the present disclosure.

FIG. 8 is a part of a cross-sectional view of a coolant control valve unit according to embodiments of the present disclosure.

As shown in FIG. 8, the supporting member 400 is formed at both ends of the holder 210, and the tip of the supporting member 400 is supported by the interior surface 600 of the housing 200.

Therefore, the holder 210 may protrude to the outside of the housing 200 due to the elastic force of the elastic member 310 supporting the valve 305, where the supporting member 400 may effectively prevent the protrusion.

While this disclosure has been described in connection with certain embodiments, it is to be understood that the disclosure is not limited to the disclosed embodiments. In addition to the disclosed embodiments of the present disclosure, the present disclosure includes all of the modifications that belong to the technical scope considered to be equivalent to that of the present disclosure, which may be easily defined by those skilled in the art to which the present disclosure belongs.

DESCRIPTION OF SYMBOLS

100: cylinder head 105: cylinder block
110: coolant control valve unit 115: EGR cooler
120: heater core 125: radiator
130: oil cooler 135: coolant pump
140: coolant temperature sensor 145: safety valve 150: control portion 152: motor
154: gear box 156: cam
158: track 205: sealing member
200: housing 215: coolant hole
220: metal gasket 210: holder
300: rod 305: valve
310: elastic member 400: supporting member
500: bypass passage 507: mounting surface
505: latch protrusion 510: ring member
515: latch protrusion 600: interior surface
230: opening 230a: sub-opening
210a: sub-holder

What is claimed is:

1. A coolant control valve unit, the coolant control valve unit comprising:
   a housing in which a coolant passage is formed;
   an elastic member supporting a valve of the valve unit elastically so that the coolant passage is closed by the valve;
   a holder supporting the elastic member, wherein the holder has a coolant hole corresponding to the valve; and
   a fixing portion that fixes the holder to the housing, wherein the fixing portion includes a metal gasket mounted along a periphery of the coolant hole, an edge of the metal gasket being supported by a latch formed in the housing,
   wherein the metal gasket includes:
   a circular ring member; and
   a latch protrusion that extends outwards from the ring member.

2. The coolant control valve unit of claim 1, wherein the fixing portion includes:
   a supporting member formed at a predetermined position in the holder and supported by or coupled to an interior surface of the housing.

3. The coolant control valve unit of claim 1, wherein:
   the metal gasket is inserted into a mold when the holder is injection molded by the mold.

4. The coolant control valve unit of claim 1, wherein:
   the latch protrusion is arranged at predetermined distance along a circumference of the ring member.

5. The coolant control valve unit of claim 1, wherein:
   the ring member is fixed to the holder, and
   the latch protrusion is supported by the latch.

6. The coolant control valve unit of claim 1, wherein:
   a sealing member is mounted on an outer mounting surface of the housing in which the holder is disposed.

7. The coolant control valve unit of claim 1, wherein:
   the metal gasket is fixed to the holder at a position corresponding to another elastic member supporting a lower surface of a safety valve.

8. The coolant control valve unit of claim 1, wherein:
   at least two coolant passages are formed in the housing,
   at least two valves are formed in accordance with the at least two coolant passages,
   at least two elastic members are used in accordance with the at least two valves; and
   coolant holes are formed in the holder at positions corresponding to the respective at least two elastic members.

9. The coolant control valve unit of claim 1, wherein:
   the holder is mounted inside the housing,
   the fixing portion is fixed to the housing so that the holder does not protrude through an opening formed in the housing,
   a mounting surface is formed on an exterior surface of the housing, and
   a sealing member is mounted along an edge of the mounting surface.

10. A coolant control valve unit, the coolant control valve unit comprising
    a housing having coolant passages formed in one side thereof;
    elastic members supporting valves elastically so that the valves close the respective coolant passages, wherein one of the valves is a thermostat-type safety valve;
    a holder fixed to the housing and supporting the elastic members, wherein coolant holes are formed in the holder in correspondence with the valves; and
    a fixing portion that fixes the holder to the housing,
    wherein the fixing portion includes:
    a supporting member formed in the holder at a predetermined position and supported by or coupled to an interior surface of the housing; and
    a metal gasket mounted along a periphery of a coolant hole among the coolant holes which corresponds to the safety valve, the edge of the metal gasket being supported by a latch formed in the housing.

11. The coolant control valve unit of claim 10, wherein the metal gasket includes:
    a circular ring member; and
    a latch protrusion that extends outwards from the ring member;
    wherein the latch protrusion is arranged at predetermined distance along a circumference of the ring member.

* * * * *